United States Patent [19]

Baldi et al.

[11] E Re. 29,212

[45] Reissued May 10, 1977

[54] PACK DIFFUSION COATING OF METALS

[75] Inventors: Alfonso L. Baldi, Drexel Hill, Pa.; Victor V. Damiano, Pennsauken, N.J.

[73] Assignee: Alloy Surfaces Co., Inc., Wilmington, Del.

[22] Filed: Mar. 1, 1976

[21] Appl. No.: 662,517

Related U.S. Patent Documents

Reissue of:

[64] Patent No.: 3,867,184
Issued: Feb. 18, 1975
Appl. No.: 328,378
Filed: Jan. 31, 1973

[52] U.S. Cl. ..... 427/253; 427/252
[51] Int. Cl.[2] ..... C23C 9/00
[58] Field of Search ..... 427/252, 253

[56] References Cited

UNITED STATES PATENTS

| | | | |
|---|---|---|---|
| 3,073,015 | 1/1963 | Wachtell et al. | 427/253 X |
| 3,079,276 | 2/1963 | Puyear et al. | 427/253 |
| 3,096,160 | 7/1963 | Puyear | 427/253 X |
| 3,096,205 | 7/1963 | DeGuisto | 427/253 |
| 3,108,013 | 10/1963 | Chao et al. | 427/253 |
| 3,257,230 | 6/1966 | Wachtell et al. | 427/250 X |

FOREIGN PATENTS OR APPLICATIONS

| | | |
|---|---|---|
| 1,237,713 | 6/1960 | France |

*Primary Examiner*—Harris A. Pitlick
*Attorney, Agent, or Firm*—Connolly and Hutz

[57] ABSTRACT

In the diffusion coating of aluminum onto brazed metal, the penetration of the aluminum into the brazing is reduced by conducting the diffusion coating with hydrated aluminum chloride, bromide or iodide as energizer, with the energizer preferably kept out of contact with the work being coated until the energizer volatilizes. This is particularly suited for aluminizing chromium-containing surfaces. Chromium diffusion coatings are less apt to form undesirable oxide inclusions when the diffusion coating is from a pack contacting at least about 3% $Ni_3Al$. Also the formation of undesirable alpha-chromium is reduced when the pack diffusion is carried out with a retort effectively not over 5 inches in height. Pack aluminizing where the aluminizing is inhibited by the presence of chromium in the pack makes a very effective top coating over platinum plated or platinum coated nickel-base super-alloys. Aluminized nickel can also have its aluminum attacked and at least partially removed with aqueous caustic to leave a very highly active catalytic surface. Pack diffusion can also be arranged to simultaneously provide different coatings in different locations by using different pack compositions in those locations. An aluminizing pack containing a large amount of chromium provides a thinner aluminized case than an aluminizing pack containing less chromium and some silicon. Also a cobalt-chromium pack deposits essentially a chromized case when energized with a chloride, but deposits large amounts of cobalt along with chromium when energized with an iodide.

6 Claims, No Drawings

PACK DIFFUSION COATING OF METALS

Matter enclosed in heavy brackets [ ] appears in the original patent but forms no part of this reissue specification; matter printed in italics indicates the additions made by reissue.

The present invention relates to the diffusion coating of metal.

Among the objects of the present invention is the provision of improved coating processes and improved coated products, particularly to protect metals against corrosion or oxidation at elevated temperatures or in saline atmospheres, or both.

The foregoing as well as additional objects of the present invention will be more fully understood from the following description of several of its exemplifications.

The pack aluminizing of metal that contains brazing having low melting ingredients, presents a problem in that the aluminum deposited from the pack onto the metal diffuses very rapidly through the brazing and weakens it. This is particularly troublesome where the metal carrying the braze is one such as a chromium-containing steel into which aluminum does not diffuse rapidly at the processing temperatures used.

According to the present invention the foregoing penetration into the low-temperature braze is sharply reduced by conducting the aluminizing in an unsealed or partially covered retort with hydrated aluminum chloride as the energizer. The hydrated aluminum chloride is preferably confined to portions of the diffusion coating pack below or otherwise out of contact with the work pieces being aluminized. The following is an example of such aluminizing:

EXAMPLE A

The work piece was a jet engine compressor stator assembly having a set of type 410 stainless steel vanes brazed between inner and outer rings of the same metal 10 and 30 inches in diameter respectively, to make an assembly of radially oriented vanes. The braze metal was AMS 4770 and consisted of, by weight:

| | |
|---|---|
| Cadmium | 18% |
| Zinc | 16.5% |
| Copper | 15.5% |
| Silver | 50% |

The stator was packed in an aluminizing pack consisting of 20% aluminum powder (325 mesh) and 80% alumina (325 mesh) with an addition of $AlCl_3 \cdot 6H_2O$ as an energizer in an amount 1% of the total weight of the aluminum and alumina. In a doughnut-shaped retort 6 inches deep a ½ inch layer of the energizer-free pack was first poured, after which all the energizer needed for a 5-inch layer of the pack was added and mixed into that ½ inch layer. Another ½ inch layer of the energizer-free pack was then stratified over the first ½ inch layer, the stator was placed over the thus-prepared layer combination, and the remaining 3 inches of energizer-free pack then poured over the stator, completely covering it, and tamped down onto it. The retort thus loaded was covered with a perforated 16 gauge plate having 3-millimeter holes on 5-millimeter centers, and placed on a furnace support. An outer retort bell was lowered over the doughnut-shaped retort and sealed against the support, and a furnace shell was lowered around the outer retort.

The inner retort and its perforated cover was made of plain carbon steel, but the outer retort was made of type 310 stainless steel. In addition the outer retort was equipped with gas inlet and outlet conduits so that the contents of the outer retort could be blanketed or bathed in a special atmosphere. A flow of argon was started through the interior of the outer retort to flush out the air and after the furnace shell was in place the flow of argon was changed to a flow of hydrogen and the furnace started. The inner retort was heated up to 875° F in about 12 hours, and then maintained at that temperature for 20 hours, after which the furnace was turned off and lifted away.

The flow of hydrogen can be monitored with a flow meter while burning the gas discharging from the outlet conduit of the outer retort. When the inner retort has cooled down to 300° F the hydrogen flow is changed back to an argon flow, and after the hydrogen is thus flushed out of the outer retort that retort is removed and the contents of the inner retort removed. During the heat-up the temperature of the coating pack, sensed by a thermocouple inserted into the pack, rises quite uniformly with time. At the conclusion of the heat, when the outer retort is removed white deposits of aluminum chloride are evident on its interior surface.

The stator removed from the inner retort after the heat is completed is lightly vapor-honed with +250 mesh alumina grit dispersed in water and propelled by compressed air. Test sections run simultaneously with the stator exhibit metallographically a uniform aluminum-rich case about 0.6 mils deep, with a 6-mil deep penetration of aluminum into the braze. When ½% anhydrous aluminum chloride is used instead of the hydrated aluminum chloride, the aluminum penetration into the braze is fully 3 times as deep, and the aluminum case on the remainder of the work piece is again about 0.6 mils deep.

Similar comparative results are obtained when the braze used is 56% Ag, 22% Cu, 17% Zn and 5% Sn. When the braze metal is 54% Ag, 40 % Cu, 5% Zn and 1% Ni and the energizer hydrated aluminum chloride, the penetration of the aluminum into the braze is about three times as much as the case produced on the stainless steel, whereas with anhydrous aluminum chloride the penetration into this braze is about 6 times the case on stainless steel. The decrease in braze penetration effected by the present invention is most significant when the braze alloy contains more than 3% of metals, such as zinc and cadmium, melting below 650° C.

The aluminum content of the pack can vary from about 5% to about 80%, not considering the energizer content, and the content of the hydrated energizer can range from about 0.002 to about 0.007 gram-mols per 100 grams of pack without significantly affecting the improvement in the reduction of aluminum-penetration. Similarly the aluminizing temperature can vary from about 750° F to about 1100° F with the aluminizing time ranging from about 4 hours to about 30 hours depending upon the amount of aluminum pick-up desired, an amount that can be as little as 0.5 to as much as 10 milligrams of aluminum per square centimeter of workpiece surface, to give cases from about 0.2 to about 3 mils thick.

Hydrated aluminum bromide or hydrated aluminum iodide can be substituted for the hydrated aluminum chloride, also without materially changing the results and without detracting from the reduction in aluminum penetration into the braze. Other chromium-bearing steels such as greek ascoloy, other series 400 or hardenable stainless steels and even steels containing as little as 5% chromium or an electrolytic chromium plating, can be aluminized in any of the foregoing packs by these methods to apply coatings that help protect them against high temperature corrosion, and particularly against saline conditions such as in the salty air encountered by jet airplanes at low altitudes above or adjacent to the ocean.

Other metals such as plain carbon or low alloy steels or series 300 stainless steels or nickel base and cobalt base superalloys, are also protected by the aluminizing operation of the present invention with similarly limited penetration into any of the foregoing brazes having more than 3% low-melting metal.

The aluminizing of the present invention gives very good results even with a virgin pack, that is even when the pack being used has not been previously used. Thus there is no need to subject the pack ingredients with or without the energizer, to a heat with a dummy work piece, or with no work piece. However an aluminizing pack that has been previously used can be reused, and for this purpose is rejuvenated by adding a fresh supply of the energizer inasmuch as about 60% or more of the energizer is driven off during the course of an aluminizing run. A little fresh aluminum powder can also be added to the pack at each reuse to make up for depletion. The particle sizes of the aluminum and the alumina are not critical and the process of the present invention can be practiced with these particles as large as +4 mesh and as small as −360 mesh. It is preferred to have the aluminum and the alumina particles both of approximately the same size and at least as fine as −150 mesh. Extremely fine aluminum tends to be quite pyrophoric until it is mixed with the diluent.

The following are additional examples of the present invention:

| EXAMPLE B | |
|---|---|
| Pack composition | |
| Aluminum (−200 mesh +325 mesh) | 30% |
| Alumina (−325 mesh) | 70% |
| Energizer $AlBr_3 . 6H_2O$ | 1.3% |
| Work piece-compressor blades of greek ascoloy | |
| Braze - 18% Cd. 16.5% Zn. 15.5% Cu. 50% Ag | |
| Aluminizing temperature | 900° F |
| Time at temperature | 15 hours |

| EXAMPLE C | |
|---|---|
| Pack composition: | |
| Aluminum (−325 mesh) | 70% |
| Magnesia (−200 mesh +325 mesh) | 30% |
| Energizer $AlI_3 . H_2O$ | 1.80% |
| Work piece-compressor blade of 17–4 p.h. stainless steel | |
| Braze - 50% Ag. 40% Cu. 5% Zn. 1% Ni | |
| Aluminizing temperature | 885° F |
| Time at temperature | 15 hours |

Inasmuch as aluminum has a melting point a little over 1200° F, it is preferred not to aluminize at temperatures above 1100° F unless the aluminum content of the pack is below about 40%. Also the brazes with more than 5% low melting metal generally melt at temperatures of about 1200°–1400° F, and to limit their penetration by aluminum the aluminizing should be conducted at a temperature at least about 100° F below the melting point of the braze. The actual temperature used is also adjusted to the case depth desired and the properties of the base metal, as is well known.

As pointed out above, the inert filler used with the aluminizing packs of the present invention can be any filler known in the art. Also the aluminizing of this invention is conducted in a hydrogen-bathed atmosphere, although the hydrogen can be diluted with as much as three times its volume of inert gas such as argon. An atmosphere generated solely by the energizer-containing pack does not operate satisfactorily, and neither does an atmosphere of argon or other inert gas, or one bathed with such inert gases.

Instead of confining the energizer to the lower portions of the pack so as to be out of contact with the work piece, the energizer can be kept out of such contact by containing it in one or more unsealed or perforated containers of non-interfering material like aluminized steel or uncoated steel, embedded in any portion of the pack away from the work.

The restricted braze penetration of the present invention is also obtained when all or part of the water portion of the hydrated energizer is added to the pack separately from the aluminum halide, which aluminum halide can be entirely or partially anhydrous. Completely anhydrous aluminum chloride is preferred for such operation by reason of its relatively low cost.

The aluminizing of the present invention can also be effected on work pieces that have been previously given a chromium diffusion coating. Such a prior coating reduces the penetration of the aluminum and if a braze is applied after the chromium diffusion, the aluminum penetration into the braze is emphasized by reason of the very poor penetration of the aluminum into the chromium-diffused surfaces.

One very effective technique for chromizing a superalloy work piece in preparation for the aluminizing is as follows:

EXAMPLE D

A group of B-1900 jet engine vanes was packed in a cup-shaped retort 4 inches high in an $NH_4Cl$-energized diffusion coating pack having 14% powdered chromium and 15% powdered $Ni_3Al$. The remainder of the pack was alumina, but can be any other inert material. The energizer content was ½% by weight of the total of the other pack ingredients. Chromizing was conducted in a hydrogen-bathed atmosphere, as in Example A, with the retort loosely covered, holding a 1925° F temperature for 20 hours, giving a very uniform chromized case about 0.7 mils deep, essentially free of oxide inclusions and without the formation of alpha-chromium phase.

In the event the $Ni_3Al$ content of the pack is less than about 3% by weight, a substantial amount of oxide inclusions are formed in and below the case, and these may cause the case to spall off under the influence of repeated thermal shock treatment, particularly if their number increases to form a continuous layer of inclusions. Such inclusions tend to form in any superalloy containing a substantial amount of aluminum and/or titanium. The number of such inclusions formed diminishes sharply when the $Ni_3Al$ content of the pack is at least 3% by weight, and reaches a minimum when the $Ni_3Al$ content is about 6%. As much as about 20%

$Ni_3Al$ can be contained in the pack so that there is considerable tolerance for it and a wide concentration range for its use. It is preferred to use 8 to 15% of $Ni_3Al$ so as not to require accurate measuring and also to make it unnecessary to add make-up $Ni_3Al$ after each use of the chromizing pack.

In addition to reducing oxide inclusions, the $Ni_3Al$ behaves like an inert diluent in the pack since it does not interfere significantly with the chromizing. Thus the chromium content of the pack can be as low as 10% and as high as 40%, regardless of the $Ni_3Al$ content.

The formation of oxide inclusions is also reduced when the chromizing takes place in an evacuated atmosphere as described for example in U.S. Pat. No. 3,290,126 granted Dec. 6, 1966. In an evacuated atmosphere the chromium content of the pack should be relatively high, e.g. from about 25 to about 60% by weight to keep the chromizing time from exceeding 30 hours, and the energizer should be a non-volatile halide.

When chromizing at atmospheric pressure or at somewhat above atmospheric pressure there is a tendency to form alpha phase chromium on the chromized superalloy work piece even when the chromium pick-up is as low as 1 to 3 milligrams per square centimeter. Such alpha phase formation is undesirable since it may embrittle the base metal. By using a cup-shaped retort effectively not over 5 inches in height, it has been discovered that the formation of alpha chromium phase is prevented. Retort cups taller than 5 inches can be effectively used without alpha chromium formation by perforating the side wall of the retort at a level within 5 inches of its bottom. The perforations can be ⅛ inch diameter holes drilled through the retort wall to provide venting about 1 to 2 square inches in cross-sectional area for every pound of diffusion coating pack. Small holes such as those ⅛ inch in diameter generally do not permit any significant amount of the pack to spill out through them, but larger size holes can be used and covered by a wire screen when the retort is being loaded.

It is preferred to maintain an effective retort height of at least 2 inches, as by providing the foregoing venting at least 2 inches up from the bottom of the retort. It should also be noted that such venting is not to the air but to the space that surrounds the inner retort. That space is bathed by a stream of hydrogen, but can instead be bathed by a stream of inert gas like argon, during the chromizing.

The aluminizing of Examples A, B and C should be conducted without having more than a slight amount of chromium present in the aluminizing pack. A chromium content about half that of the aluminum, by weight, greatly reduces the aluminum coating rate and calls for increasing the coating temperature above the melting point of the braze. However such chromium-inhibited aluminizing is desirable as a top coating over a platinum diffusion or electroplated coating on nickel-base superalloys where there is no such brazing, and in such a combination provides greater sulfidation resistance at high temperatures than the use of the uninhibited aluminizing in such a combination as described in U.S. Pat. No. 3,677,789 granted July 18, 1972. The same advantage is obtained when other platinum metals are used in place of platinum. Suitable examples of chromium-inhibited aluminizing are described in Canadian Pat. No. 806,618 issued Feb. 18, 1969, and in U.S. Pat. No. 3,257,230 granted June 21, 1966. The nickel-base superalloys are also described in those patents and generally are those high temperature alloys which contain at least about 50% nickel and about 6 to 25% chromium.

The following coating illustrates this coating combination.

EXAMPLE E

A jet engine (hot section) vane of B-1900 alloy and electroplated with a 0.0003 inch thick layer of platinum was subjected to a hydrogen-bathed pack diffusion coating at 1890° F for 12 hours, in a previously used pack consisting of, by weight:

| | |
|---|---|
| magnesothermic chromium powder | 45% |
| alumina (−325 mesh) | 45% |
| aluminum powder (−325 mesh) | 10% |

activated with ½% $NH_4Cl$.

The thus treated blade had a 0.003 inch thick diffusion case and shows exceptional sulfidation resistance. Such sharply improved sulfidation resistance does not seem to be obtained with cobalt-based superalloys, even those cobalt-based superalloys that contain as much as 10% nickel.

An aluminum diffusion coating can also be used to prepare catalytic nickel. Thus a foil 5 mils thick of pure nickel can be aluminized in an ammonium-chloride-energized pack consisting of 20% aluminum and 80% alumina, using a coating temperature of 1100° F for 10 hours. The coated surface contains at least about 30% aluminum, and when subjected to treatment with 10% aqueous caustic soda at 20° to 40° C loses most of its aluminum to the caustic soda, leaving a highly active nickel surface that effectively catalyzes hydrogenation. The caustic stops reacting when the aluminum content of the surface is sufficiently depleted, and the thus treated surface should, until ready for use, be kept under water or other protective fluid to keep it from heating up as a result of contact with the air. The resulting foil is an effective catalyst for hydrogenating soybean oil for example, using the continuous flow technique as described on pages 522 and 523 of "Unit Processes in Organic Synthesis", P. H. Groggins, editor-in-chief, fourth edition, published 1952 by McGraw-Hill Book Company. A catalyst contact time of about 15 seconds at a temperature of 130° C and a hydrogen pressure of 100 atmospheres effects substantial hydrogenation.

Nickel wool, or nickel-plated iron wool or foil, can be aluminized instead of nickel foil to provide the catalytic nickel surface. The dissolving of the aluminum from the surface can be effected with any caustic including caustic potash and should be carried out at a temperature below the boiling point of the caustic solution used. The aluminized nickel can be stored as such for many months, until just before catalytic use, the aluminum being then dissolved to provide freshly formed catalyst.

Diffusion coatings can also be applied so that some portions of a work piece contain a thinner coating than other portions. Thus roots or hollow interiors of turbine blades can be arranged to be diffusion coated at the same time the remainder of the blade is diffusion coated, but with less coating than the remainder of the blade. The following example is typical:

EXAMPLE F

A set of hollow first stage turbine blades of B-1900 alloy had their hollow interiors filled with the following aluminizing pack:

Inside Pack
45% chromium
10% aluminum
Balance alumina plus ½% $NH_4Cl$

The blades so filled were packed in an aluminizing pack containing:

Outer Pack
20% chromium
11% aluminum
1.4% silicon
Balance alumina plus ½% $NH_4Cl$ All ingredients were −200 mesh. A retort so packed was then subjected to a hydrogen-bathed coating heat at 1800° F for 5 hours, and after clean-up the blades showed a 4.3 milligram per square centimeter pick-up of aluminum on their interior surfaces, with a 10.2 milligram per square centimeter aluminum pick-up on their exterior surfaces.

In the same way the roots or trailing edges of jet blades or vanes can be given coatings thinner than the remainder of the blades or vanes. Reducing the chromium content of the internal pack to 20% increases the internal coating weight. An increase in outer coating is obtained by reducing the chromium content of the outer pack.

Conversely, increasing the chromium content of the inner pack to 60% further diminishes the internal coating.

Without the chromium the silicon does not appreciably diminish the magnitude of the aluminum coated, and without the silicon the changes in chromium content have much less effect. The combination of the chromium, silicon and aluminum provides the coating control when the aluminum content of the pack is as little as 3% and as much as 20%, with the chromium content greater than, preferably about 1.5 to 3 times that of the aluminum, and the silicon content about 10 to 20% that of the aluminum. The coating temperatures can vary from about 1700° F to about 2200° F, and the work pieces can be any metal that is not melted at the coating temperature, such as any nickel- or cobalt-based superalloy, DS nickel, DS nichrome, chromium-containing iron, and type 300 and 400 stainless steels.

The B 1900 alloy is preferably heat treated at 1975° F for 4 hours followed by rapid cooling at least as fast as air cooling to below 200° F, with a subsequent aging at 1650° F for 10 hours and a final rapid cooling, in order to develop its best mechanical properties. These heat treating steps can be carried out during the diffusion treatment to differentially coat, by using the small containers as described in application Ser. No. 159,175, filed July 2, 1971 (U.S. Pat. No. 3,824,122 granted July 16, 1974).

Another technique for simultaneously applying two different diffusion coatings is to use different energizers. This is illustrated by the following example:

EXAMPLE G

The same B-1900 blades of Example F had their interiors filled with the following diffusion coating pack:

| | Inside Pack |
|---|---|
| 18.5% | $Ni_3Al$ |
| 18.5% | Alumina |
| 47% | Co |
| 15.5% | Cr |
| 5% | $NH_4Cl$ |

The thus filled blades were packed in the following pack:

| | Outer Pack |
|---|---|
| 18.5% | $Ni_3Al$ |
| 18% | Alumina |
| 46.5% | Co |
| 15% | Cr |
| 2% | $NH_4I$ |

Using a 2000° F coating temperature for 10 hours in a hydrogen-bathed atmosphere produced an internal coating which was essentially a chromized case containing a negligible amount of cobalt. On the other hand the outer coating was a case that contained more cobalt than chromium and provided much more high temperature life after an aluminum top coat. The two cases had approximately the same thickness. It will be noted that the $Ni_3Al$ in these formulations acted as inert diluent and can be replaced by alumina where the formation of oxide inclusion is not objectionable or when the chromizing is effected under subatmospheric pressure.

Mixing the two energizers ($NH_4Cl$ and $NH_4I$) enables the application of diffusion coatings of intermediate composition. These are also obtainable by using $NH_4Br$ as energizer. Other volatilizable compounds of chlorine, bromine and iodine can be used as energizers with similar results. The wall of the blades of Example G does a good job of keeping the diffusion coating atmosphere on the outside of each blade from affecting the diffusion coating atmospheres in the interiors of the blades. Where the different coatings of Example G are to be applied to adjacent portions of the outer surfaces, these portions can be effectively separated by a metal wall separating one pack from the other.

The foregoing chromium and cobalt-chromium coatings are particularly suited for application at temperatures of at least 1700° F to protect nickel-base superalloys against high temperature oxidation and sulfidation, in which event it is preferred to apply over these coatings a coating of aluminum or of aluminum-chromium mixtures such as those described in U.S. Pat. Nos. 3,528,861 granted Sept. 15, 1970, and 3,676,085 granted July 11, 1972.

Obviously many modifications and variations of the present invention are possible in the light of the above teachings. It is therefore to be understood that within the scope of the appended claims the invention may be practiced otherwise than as specifically described.

What is claimed:

1. In the process of diffusion coating a metal article, the improvement according to which a single diffusion coating heat [ is arranged to coat different portions of the article in different ways by maintaining the different portions in contact with different diffusion coating packs ] *applies essentially the same coating in predetermined different thicknesses to adjacent portions of the article by packing one portion in a diffusion coating pack containing an inhibitor for the desired coating to inhibit the coating thickness formed on that portion as against the coating thickness formed on a different portion.*

2. The combination of claim 1 in which the metal article is a superalloy, the diffusion coating is an aluminum diffusion coating, the different coating packs are chromium-containing aluminum diffusion packs, one pack contains more chromium than aluminum, and another pack contains less chromium than the one pack, and also contains silicon in an amount from about 10% to about 20% of the aluminum by weight.

[ 3. The combination of claim 1 in which the different packs differ in that they have different energizers, and the different portions of the metal are on opposite sides of a metal wall that effectively inhibits the intermingling of the atmospheres at these portions. ]

4. The combination of claim [ 3 ] *6* in which cobalt and chromium are the essential diffusible metal ingredients of both packs, one pack is energized with a chloride energizer to cause diffusion coating of essentially only the chromium and the other with an iodide energizer to cause diffusion coating of more cobalt than chromium.

*5. The combination of claim 1 in which the metal article coated is a turbine engine vane or blade.*

*6. In the process of diffusion coating a metal article, the improvement according to which a single diffusion coating heat applies significantly different coatings to different portions of the article from packs that differ from each other essentially only in the compositions of their energizers.*

*7. The combination of claim 6 in which the metal article coated is a turbine engine vane or blade.*

* * * * *